April 4, 1961     D. W. DANIEL     2,977,726
GEAR HONING TOOL
Filed April 22, 1957
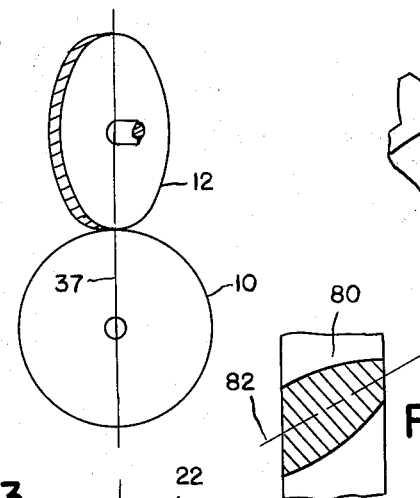
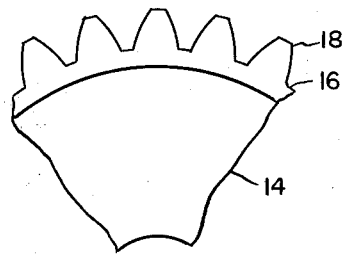
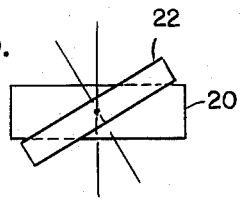
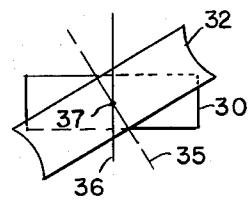
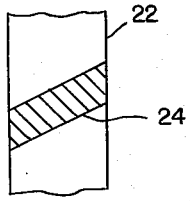
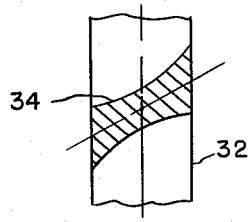
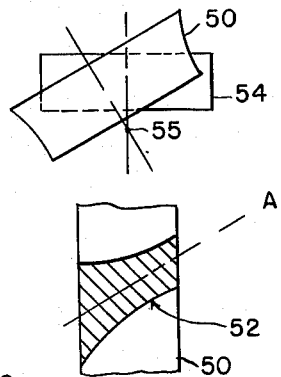
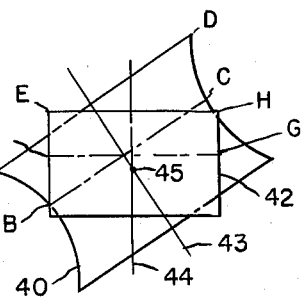
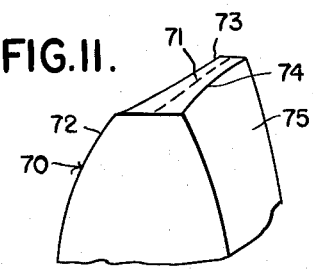
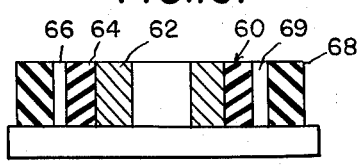
INVENTOR.
DAVID W. DANIEL
BY *Whittemore,*
*Hulbert & Belknap*
ATTORNEYS

United States Patent Office 2,977,726
Patented Apr. 4, 1961

2,977,726
GEAR HONING TOOL

David W. Daniel, Detroit, Mich., assignor to National Broach & Machine Company, Detroit, Mich., a corporation of Michigan Filed Apr. 22, 1957, Ser. No. 654,215
4 Claims. (Cl. 51—206)

The present invention relates to a gear hone.

It is an object of the present invention to provide a gear hone characterized in that it is shaped to have extended area contact with the teeth of a work gear while at the same time being capable of removal from a mold in which it is cast.

More specifically, it is an object of the present invention to provide a gear-like hone in which the teeth of the hone area of continuously decreasing chordal thickness from one end to the other, and in which the side surfaces of the teeth are concave so as to have an elongated zone of contact with the teeth of a work gear extending longitudinally thereof when meshed with a work gear at crossed axes.

Other objects and features of the invention will become apparent as the description proceeds, especially when taken in conjunction with the accompanying drawing, illustrating preferred embodiments of the invention, wherein:

Figure 1 is a diagrammatic view illustrating the relationship between a gear-like hone and work gear at crossed axes.

Figure 2 is an enlarged fragmentary elevation of a portion of a hone.

Figure 3 is a diagrammatic view illustrating the relationship between a hone having unmodified teeth and a work gear.

Figure 4 is a diagrammatic view representative of the cross-sectional shape of a hone tooth determined by its intersection with a cylinder and developed into the plane of the paper.

Figure 5 is a diagrammatic view similar to Figure 3, illustrating the relationship resulting when a modified hone is employed.

Figure 6 is a view similar to Figure 4 showing a longitudinally concave hone tooth.

Figure 7 is a diagrammatic view illustrating the relationship of the gear and hone as employed in accordance with the present invention to larger members of which they are a part.

Figure 8 is a diagrammatic view illustrating the meshing relationship between the hone of the present invention and a work gear.

Figure 9 is a view similar to Figure 4 illustrating the cross-sectional shape of a tooth of a hone constructed in accordance with the present invention.

Figure 10 is a transverse sectional view through a mold showing a hone in place therein.

Figure 11 is an enlarged fragmentary view of the tooth of a hone constructed in accordance with the present invention.

Figure 12 is a view similar to Figure 9 showing the tooth of a honing tool modified for use with an internal gear.

The present invention relates generally to the finishing of gears by running them in mesh with a gear-like hone, the teeth of which are conjugate at crossed axes to the teeth of the gear.

In Figure 1 a work gear 10 is represented diagrammatically as in mesh with a gear-like hone 12. The teeth of the gear and hone are omitted for clarity but it is well understood that the teeth of the gear and hone may mesh in conjugate action with the axes of the gear and hone crossed in space as illustrated, if the helix angle of the teeth of the hone is selected in accordance with the particular angular relationship between the axes of the members.

The hones constructed in accordance with the present invention are made so that at least the surface portions thereof are formed of a relatively hard yet slightly yieldable and highly resilient resinous composition having abrasive particles embedded therein. A fragment of such hone is illustrated in Figure 2 where the central core portion 14 is indicated as separate from the toothed rim portion 16 having the involute teeth 18.

As is now well understood, the crossed axes relationship employed in gear finishing as illustrated in Figures 3 and 4, results in theoretical point contact between the surface of each tooth of the gear and the adjacent tooth surface of the tool or hone. In Figure 3 for example, a work gear 20 is indicated diagrammatically as in mesh with a gear-like tool 22, which may be a hone of the general character disclosed herein, with the axes of the gear and hone crossed in space at an angle, as for example approximately 30 degrees.

In Figure 4 there is shown an enlarged fragmentary section of the tool 22, a tooth 24 thereof being shown in a developed section. The section of the tooth 24 is such as would be intercepted by a cylinder concentric with the hone and passing through an intermediate portion of the hone tooth. This section is then developed into the plane of the paper and appears as a parallelogram. From this illustration it is apparent that the tooth 24 of the tool 22 is of uniform chordal thickness from one end to the other. Due to the crossed axes relationship of the gear and hone, the surfaces of each of the teeth 24 of the hone are in theory capable of contacting only a point on the adjacent surfaces of the teeth of the gear. In practice of course the area of contact spreads over a small area.

Due to the nature of the material of the hone, the theoretical point of contact or the actual very limited area contact found in practice, has a tendency to cause the material of the hone to wear away rather rapidly. As this takes place, a hollow or longitudinal concavity appears in the teeth of the hone. This in turn results in extending the area of contact between the teeth of the gear and hone longitudinally of the teeth thereof. If continued to completion, the concavity in the surface of the hone tooth extends for the full width of the gear tooth and results in full line contact between the teeth of the gear and hone extending from one end to the other thereof or at least through their overlapping longitudinal extent.

It will of course be appreciated that the breakdown or wearing away of the material of the hone is most rapid when the contact is over the less extended area and that the rate of breakdown slows up materially as the width of the concavity increases.

Referring now to Figure 5 there is illustrated the relationship between a gear 30 and a tool or hone 32. In this figure no effort is made to illustrate the teeth and the parts are shown in the form of a cylinder and a toroidal body having surface contact with the cylinder. This is merely suggestive of the type of modification taking place on the flank surfaces of the tooth of the hone to bring about the full contact. In Figure 6 there is shown a fragmentary portion of the hone 32 having a tooth 34 thereof shown in the section which would be intercepted by a cylinder concentric with the hone, the intersection between the cylinder and the material of the tooth being thereafter developed into the plane of the paper.

It will be apparent that the tooth 34 is of maximum chordal thickness at its end portions and is of minimum chordal thickness at its center. A tool having teeth such as 34 in mesh with the work gear 30 in the relationship illustrated in Figure 5, is adapted to contact the teeth of the gear 30 from one end to the other thereof. In this figure it will be observed that in the plane of the paper the axis 35 of the hone is angularly related to the axis 36 of the gear and the two appear to intersect at the point 37 which is midway between the sides of the gear and midway between the sides of the hone. Actually of course, the axes 35 and 36 are spaced apart as clearly illustrated in Figure 1, and what appears to be a point 37 in Figure 5 is in reality a line perpendicular to the axes 35 and 36. This line is referred to as the common normal to the axes.

Referring now to Figure 7 there is illustrated a relationship between a modified gear and tool similar to that shown in Figure 6. In this figure the tool 40 and work gear 42 have axes 43 and 44 respectively, the common normal to which appears at 45. It will of course be appreciated that the actual periphery of the hone 40 is cylindrical, rather than concave as illustrated in the figure, but the illustration of the contact between a cylinder and a concave toroidal body is suggestive of the relationship between teeth of meshing gear-like members. If the teeth of the tool 40 are modified as illustrated in Figure 6 so as to contact the meshing teeth of the gear 42 from end to end, it will be apparent that if only those portions of the hone illustrated by the body ABCD are retained and are in mesh with a gear having the outline EFGH, while the common normal to the axes at 45 is maintained, the teeth of the tool and gear will remain in full contact throughout the longitudinally overlapping extent thereof.

The foregoing is further illustrated in Figures 8 and 9 wherein a tool or hone 50 is indicated as tapered from one end to the other, this being suggestive of a tool the teeth of which are correspondingly tapered as indicated at 52 in Figure 9. This figure may be regarded as a fragmentary circumferential section, such as would be intersected by a cylindrical surface, developed into a plane. In this figure it will be observed that the tooth 52 is of continuously decreasing chordal thickness from one end to the other. It will also be observed that the side surfaces of the teeth are longitudinally concave. In practice, the rate of decrease of chordal thickness is variable and is selected such that the concavity of the side or flank surfaces of the teeth is such as to produce elongated bearing longitudinally of the teeth of a work gear when the work gear and tool are meshed with their axes crossed in space.

The foregoing is of particular importance because the toothed portion of the hone can be produced only by a casting operation in which a mold is provided which is a counterpart of the teeth of the hone. The material of the hone is so hard that it is impractical to finish it by any operation after casting. Accordingly, it is essential that the teeth of the hone be produced by an accurate casting or molding process which produces teeth of the required accuracy and surface finish for final use.

If the hone is made with teeth of uniform chordal thickness as illustrated at 24 in Figure 4, these teeth break down rather rapidly in initial use. After substantial usage they tend to assume the shape illustrated at 34 in Figure 6. By this time however, the gear and hone would be operating at a reduced center distance from that initially required before breakdown of the tooth of the hone.

It is accordingly desired to produce hone teeth which initially have the extended area contact which permits long usage without reduction in center distance or other changes in operating conditions. However, it is impossible to produce the tooth shown at 34 in Figure 6 by casting except by using a sectional mold. This in turn is not practical in the present case because it is an essential requirement that the cast tooth of the hone as removed from the mold shall have no surface imperfections. Such imperfections are normally present in castings made in sectional molds.

However, as has been explained in the foregoing, it is possible to use a concave tapered tooth such as illustrated at 52 in Figure 9 if a tool such as 50 having such teeth is meshed in proper relationship with a work gear 54. This relationship requires the relative positioning of the work gear and hone so as to cause the common normal 55 to the axes of the gear and hone to lie at one side of the hone 50. With this condition, true conjugate relationship between the teeth of the gear and hone exists and yet the teeth of the hone are tapered from one end to the other so that it is possible to withdraw a hone having such teeth from a counterpart mold.

This relationship is illustrated in Figure 10 where a hone 60 having an annular core 62 surrounded by an annular rim portion 64 of plastic material and provided with radially outwardly extending teeth 66 is formed in a mold cavity including the counterpart mold members 68 having teeth 69 which are exact counterparts of the shape of the tooth spaces in the hone 60. Inasmuch as the teeth 66 of the hone 60 are of continuously decreasing chordal thickness from one end to the other, it will be apparent that the hone may be separated axially from the mold member 68.

In Figure 11 there is shown a tooth 70 of a hone having the shape described herein. This tooth is of continuously decreasing chordal thickness and has side surfaces of longitudinal concave shape. In this figure a generally helical tooth is illustrated. The generally helical shape of the tooth is indicated by the dot and dash line 71. The profiles of the teeth are of involute shape as indicated at 72. The lines 73 and 74 illustrate the fact that the chordal thickness of the tooth 70 decreases continuously from one end to the other. The curvature of the lines 73 and 74 illustrate the longitudinally concave shape of the side surfaces 75 of the teeth.

It will be observed that the surfaces of the tooth 52 as seen in Figure 9 are such as to produce a chordal thickness which increases from right to left at an increasing rate. At the extreme right hand end of the tooth, as seen in Figure 9, each tooth has a minimum chordal thickness and at this point the boundary lines of the teeth are substantially parallel to each other and to the median plane of the tooth. As a result of the foregoing the flanks of the teeth are longitudinally concave from end to end.

The present invention is applicable to the finishing of the teeth of an internal gear. In this case, as is understood in the art, a gear-like tool designed to operate at crossed axes with the teeth of an internal gear and to have full contact from end to end thereof requires a crowned form. In other words, the tooth of the tool, for full tooth contact with an unmodified internal gear tooth, will have a maximum chordal thickness centrally thereof and a minimum chordal thickness at the ends. This is assuming of course that it operates with the common normal to the axes located generally midway between the sides of both the internal gear and the tool.

As described in connection with the honing tool for honing external gears, such a tool could not be cast because the teeth, being of variable thickness, could not be withdrawn from the mold unless a sectional mold were employed. If however, the honing tool and the internal gear are brought to mesh with the common normal to the axes extending at the corresponding side of both the gear and tool, full contact between the teeth of the tool and the teeth of the gear will result if the teeth of the honing tool are modified in a particular way.

The particular required modifications of the teeth of the honing tool for the above described action with unmodified teeth of an internal gear is that the teeth of the hone shall be the shape of one-half of the sufficiently crowned tooth having its maximum chordal thickness at the center. Such a tooth is illustrated at 80 in Figure 12 and it will be observed that the tooth has a maximum chordal thickness at its left side which is the side in use, which will be positioned at the common normal to the axes of the internal gear and tool. The position of the common normal is indicated at 82. In this case it will be observed that the chordal thickness decreases from the right and that the rate of change of chordal thickness increased from right to left. As a result of this the side surfaces of the teeth as measured from end to end are convex. Moreover, it will be observed that at the extreme left hand end of the tooth 80, the lines indicating the boundary of the tooth surfaces are substantially tangent to the median plane of the gear.

In both cases the teeth of the hone are designed to have substantially full contact from end to end with the teeth of a work gear and moreover, they are designed in a form which permits them to be withdrawn from a mold which is in effect a one-piece mold rather than composed of separable parts.

Reference is made herein to cylindrical gears by which term is meant both spur and helical gears. The generic term "cylindrical gears" is intended to differentiate from conical gears, beveled gears, and the like.

The drawing and the foregoing specification constitute a description of the improved gear hone in such full, clear, concise and exact terms as to enable any person skilled in the art to practice the invention, the scope of which is indicated by the appended claims.

What I claim as my invention is:

1. A gear hone in the form of a cylindrical gear having cast teeth formed throughout at least their surface portions of a relatively hard but slightly yieldable, highly resilient resinous material having abrasive grains embedded in surface portions thereof, said teeth being of continuously decreasing chordal thickness from one end to the other to provide for withdrawal in an axial direction from an annular counterpart mold, the rate of change of chordal thickness of the teeth from end to end being continuously variable to produce teeth having flanks which are continuously curved in developed circumferential section, the shape of the teeth being conjugate to the teeth of a cylindrical work gear to be honed having teeth at a helix angle different from that of said hone and their form being such as to produce contact throughout an elongated zone extending longitudinally of the gear teeth when meshed at crossed axes therewith with the common normal to the axes of said hone and gear being at or adjacent the side of said hone at which said hone teeth have minimum chordal thickness.

2. A gear hone in the form of a cylindrical gear having cast teeth shaped to provide for withdrawal from a unitary annular mold and further shaped to be conjugate to longitudinally uniform teeth of a cylindrical work gear having teeth of a helix angle different from the helix angle of the teeth of said hone when the hone and gear are meshed with their axes crossed at an angle represented by the sum or difference of their helix angles, the teeth of said hone being formed of a relatively hard, slightly yieldable highly resilient resin compound including abrasive grains, the teeth of said hone having a continuously decreasing chordal thickness from one end to the other to provide for withdrawal in an axial direction from a one piece annular counterpart mold, the flanks of the teeth of said hone being of such curvature longitudinally between the ends thereof to have extended area contact with the teeth of a cylindrical work gear when meshed therewith at crossed axes as aforesaid with the common normal to the axes of said hone and the work gear being located at or outwardly from one side of said hone.

3. A hone as defined in claim 2 in which the longitudinal curvature of the hone teeth is concave to provide for conjugacy at crossed axes with an external cylindrical work gear.

4. A hone as defined in claim 2 in which the longitudinal curvature of the hone teeth is convex to provide for conjugacy at crossed axes with an internal cylindrical work gear.

References Cited in the file of this patent

UNITED STATES PATENTS

| | | |
|---|---|---|
| 1,822,846 | Wildhaber | Sept. 8, 1931 |
| 1,858,568 | Wildhaber | May 17, 1932 |
| 1,955,082 | Miller | Apr. 17, 1934 |
| 1,989,650 | Drummond | Jan. 29, 1935 |
| 2,069,116 | Sanford | Jan. 26, 1937 |
| 2,076,833 | Webster | Apr. 13, 1937 |
| 2,165,386 | Klomp | July 11, 1939 |
| 2,324,377 | Fischer | July 13, 1943 |
| 2,351,842 | Seibold | June 20, 1944 |
| 2,409,958 | Rogers et al. | Oct. 22, 1946 |
| 2,527,387 | Arndt | Oct. 24, 1950 |